Patented Dec. 15, 1942

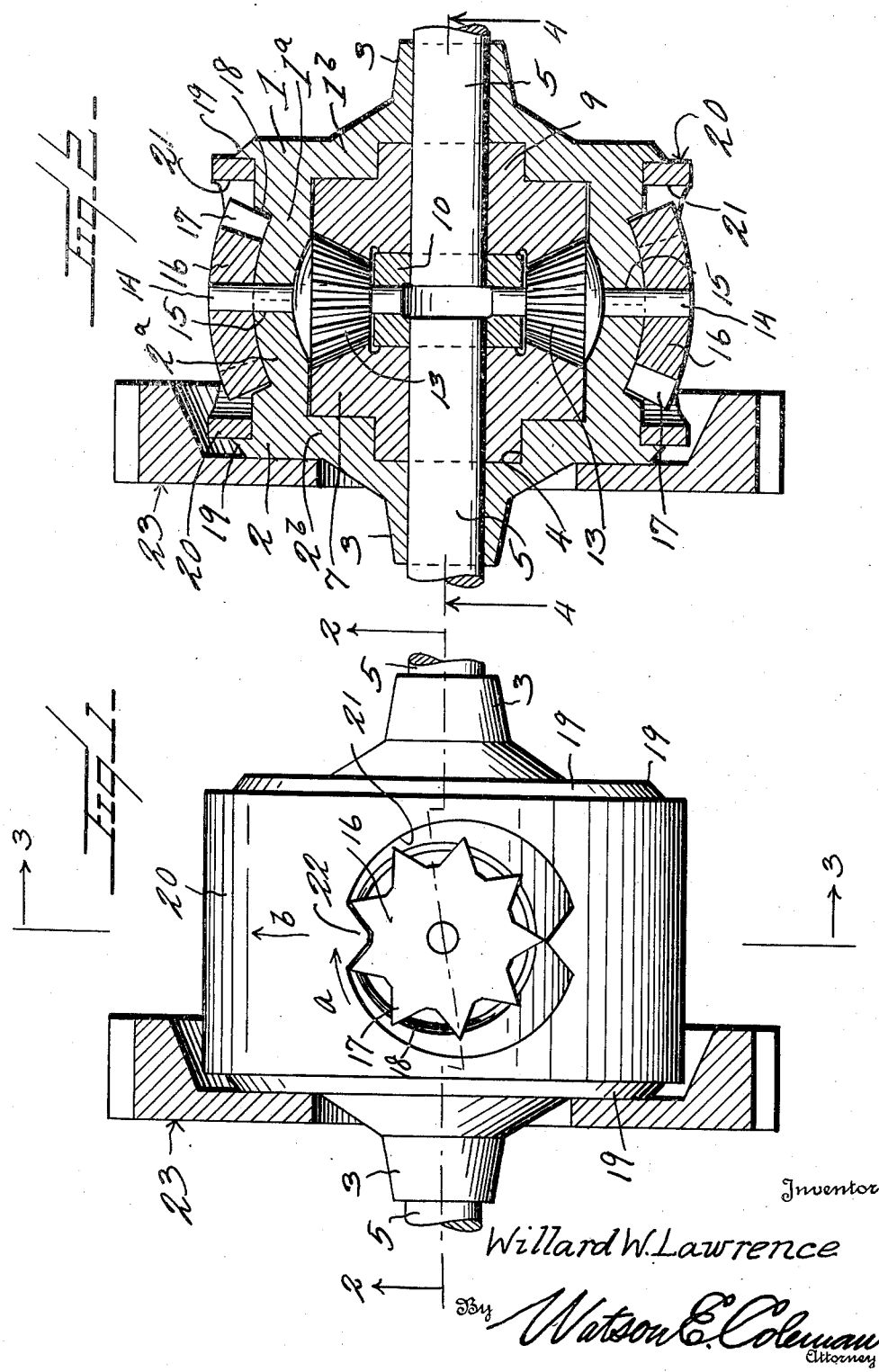

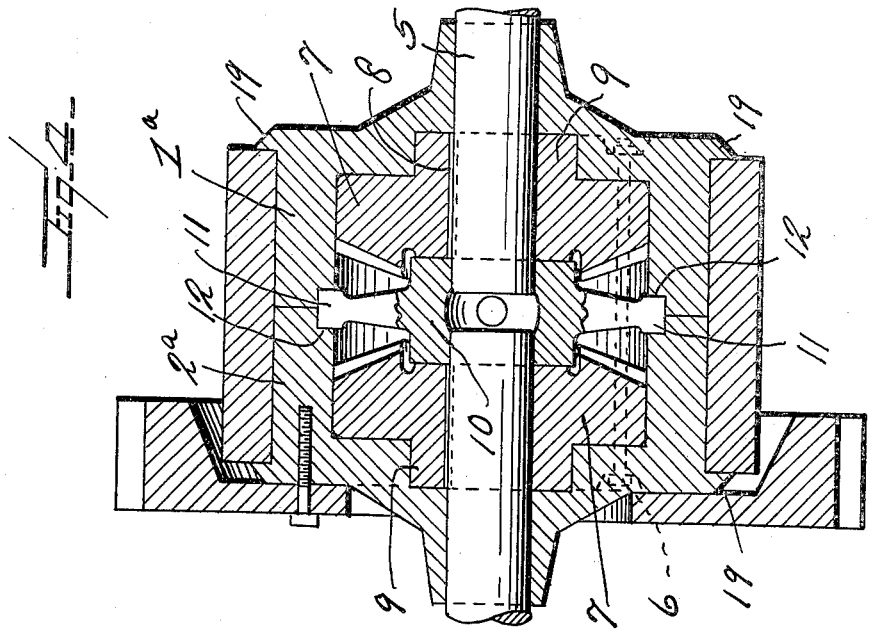
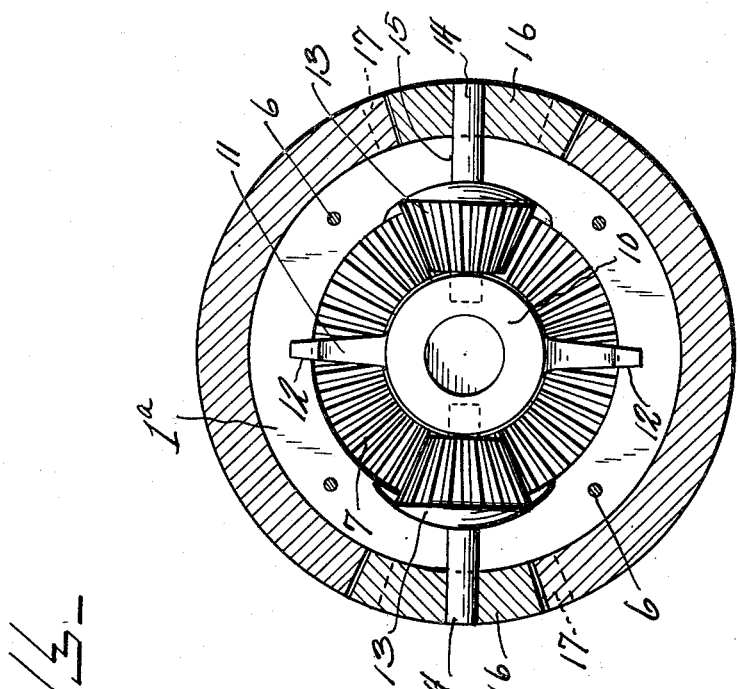

2,305,092

UNITED STATES PATENT OFFICE 2,305,092

DIFFERENTIAL MECHANISM

Willard W. Lawrence, Patoka, Ill.

Application May 1, 1941, Serial No. 391,425

6 Claims. (Cl. 74—315)

This invention relates generally to the class of differential mechanisms and pertains particularly to improvements in automatic control means therefor.

A primary object of the present invention is to provide a motor vehicle differential structure in which an automatic control means is made use of for preventing the dissipation or waste of power during the differential operation of the mechanism where one wheel connected with the mechanism may be entirely without traction, the mechanism functioning to prevent such wheel from turning enough faster than its mate to dissipate more than a small fraction of the power of the engine connected with the mechanism.

Another object of the invention is to provide an automatically controlled differential mechanism which requires that both wheels turn during differential action but which prevents one wheel from turning to the detriment of the driver.

Another object of the invention is to provide an automatically controlled differential which will function to prevent balking and skidding by acting to make both wheels turn regardless of the character of the traction surface whereby the handling or control of the motor vehicle in which the differential mechanism is employed may be more effectively accomplished on the part of the operator of the vehicle.

The invention will be best understood from a consideration of the following detailed description taken in connection with the accompanying drawings, it being understood, however, that the invention is not to be considered as limited by the specific illustration or description but that such illustration and description constitutes a preferred embodiment of the invention.

In the drawings:

Fig. 1 is a view in elevation of the mechanism embodying the present invention, without the usual enclosing axle housing, the driving gear for the mechanism being shown in section.

Fig. 2 is a sectional view taken substantially upon the line 2—2 of Fig. 1.

Fig. 3 is a sectional view taken transversely of the mechanism on the line 3—3 of Fig. 1.

Fig. 4 is a sectional view taken on the line 4—4 of Fig. 2.

Referring now more particularly to the drawings, the numerals 1 and 2 designate the two semicylindrical or cup-like halves of the gear casing for the present differential structure. These halves of the casing comprise the annular walls $1^a$ and $2^a$, respectively, and the side walls $1^b$ and $2^b$. The latter walls are formed to provide the two hubs 3 and upon the inner side of each wall is formed coaxially with the adjacent hub the annular recess 4.

Each of the hubs 3 has extended thereinto an end of an axle 5, upon which axles the gear casing as a whole freely turns.

The free edges of the annular walls $1^a$—$2^a$ of the casing are in edge opposed abutting relation, as is clearly shown in Fig. 4, and are secured together by bolts 6 which are shown in Fig. 3.

Within the gear casing are disposed the miter gears 7, each of which is splined as indicated at 8, to an end of an axle and each of these miter gears has a hub portion 9 which is rotatably located within the annular recess 4 of the adjacent casing end wall.

Interposed between the miter gears 7 is a collar 10 which receives the two adjacent ends of the axle 5. This collar has the two diametrically opposite radially extending arms 11 which are engaged in recesses 12 in the radial or circular wall of the gear casing, the arms 11 being in the plane of the division line between the casings and the recesses 12 in which the ends of the arms engage are, therefore, divided between the opposing edges of the walls $1^a$—$2^a$, so that the facility with which the parts may be assembly will be readily seen.

Upon diametrically opposite sides of the collar 10 and on an axis perpendicular to the line of the arms 11 are two pinion gears 13, each of which has a pivot shaft extending therethrough, the inner end of which is rotatably mounted in the collar 10 and extends outwardly from the pinion through the passage 15 in the circular wall of the casing. This passage 15 is formed by the provision of corresponding semi-circular grooves in the opposing edges of the walls $1^a$—$2^a$, so that the disposition of the pinion shafts in their bearing passages is accomplished with the placement of the casing sections together. The pinions, as shown, are disposed upon and mesh with the miter gears 7 in the customary manner of differential structures.

Each of the pinion shafts 15 extends beyond the outer circular wall of the casing and is integral with a toothed wheel 16, the teeth of which are indicated by the numeral 17. These wheels are of spherical form and lie in recesses 18 formed in the outer side of the circular wall of the casing, the bottom of each of which is correspondingly shaped to support the wheel upon its entire inner concave surface. Each of the casing sections is encircled at its outer end by the radially extending flange 19 and these flanges coact to maintain in position around the casing the oscillating collar or band 20. This band is provided with diametrically oppositely positioned circular openings 21, each of which has the diametrically opposite inwardly directed teeth 22.

Each wheel 16 is provided with an odd number of the teeth 17 and the radius of the wheel 16 is such with respect to the distance between the opposed points of the collar teeth 22, that when one of the teeth 22 is engaged between a pair of wheel teeth 17, the opposite or coacting tooth 22 will have its point directed toward or in opposition to the point of a tooth 17, as is clearly shown in Fig. 1.

One of the halves of the casing has secured thereto the ring gear 23 by means of which driving motion is transmitted to the differential mechanism in the customary manner.

In the operation of the present mechanism, it will be readily apparent that when differential action occurs in the present mechanism, the wheels 16 will tend to rotate, this action being brought about as a result of some situation which tends to retard the rotation of one axle without affecting the other one or a situation where a wheel connected with one axle loses traction so that a differential movement between the axles and wheels occurs. When such rotary motion of the wheels 16 takes place, it will be seen, upon reference to Fig. 1, that there will be a line of force imposed upon the engaged tooth 22 by one of the bordering teeth 17, in the direction of the arrow A, and that the tooth 17 which is approaching the tooth 22, approaches a position at right angles to the line of motion which is imparted to the collar in the direction indicated by the arrow B. This angle of approach for the tooth of the wheel with respect to the engaged tooth 22 is sharper at the beginning of the stroke and rapidly approaches a right angle at the end of the stroke. There is thus imparted to the collar 20 a driving force through a cam-like action between the alternately engaging teeth 17 and 22, resulting in a back and forth movement or crawling motion of the collar. This action will be relatively smooth due to the camming action of the teeth and not harsh as would be the result if the opposing faces of the teeth 17 and 22 were brought into contact sharply in such way as to result in the application of blows imparted to the collar teeth by the wheel teeth.

This smooth crawling effect or smooth back and forth movement of the collar around the casing is accomplished through the introduction of another factor in the form of an elastic liquid resistance to the movement of the collar at the beginning of each stroke for each tooth 17 with respect to a tooth 22. As will, of course, be readily understood, the gear casing will be enclosed in the usual axle housing which is filled or partially filled with a lubricant. Consequently, there will be interposed between the collar and the wall of the casing which the collar encircles, a thin film of this lubricant which provides the stated elastic liquid resistance to the movement of the collar. This layer of fluid which is interposed between the collar and the wall of the casing sets up a resistance to the sudden movement of the collar on the casing. Since any extended differential action in the mechanism results in only a series of "starts" of the collar, as will be readily apparent upon reference to the drawings in connection with the foregoing description, there is obtained the cumulative result of these elastic liquid resistances to add to the camming action of the opposing teeth so that there is obtained as a combined result, a smooth crawling motion which cannot be hurried and at the same time there is not encountered the undue resistance to the slow motion that is necessary for the proper adjustment and functioning of the parts.

By the provision of this escapement mechanism which, due to the stated novel elastic liquid resistance feature, cannot be hurried, one drive wheel of a pair of motor vehicle wheels between which the mechanism may be installed, cannot rotate enough faster than its mate to have any appreciable effect on slowing its mate. It, the mate, also must turn.

To illustrate further the action of the mechanism, it is found that when a car turns a corner on a curve having a 28 ft. radius, the outer wheel makes approximately seven rotations while the wheel on the inner track makes approximately six rotations during the time that the vehicle moves about 50 ft. In the mechanism if the toothed wheel 16 is provided with five teeth, the collar 20 would be required during this extent of movement of the vehicle, to make twenty "starts" while the outer wheel gains one round or turn on the curve. There is no doubt that this number of "starts" could occur while the vehicle travels 50 ft. at a speed that is safe on a curve, but it is obviously impossible for this mechanism to "crawl" through sixty of such "starts" or "clicks" as would be necessary if there were employed a wheel 16 having as many as fifteen points or teeth. From this it will be readily obvious that the speed of operation of the parts referred to, in order that the mechanism may function in the manner stated, will be obtained by the employment of a wheel or wheels 16 having between five and fifteen points. This mechanism will, therefore, allow both wheels to turn, but if there should be a tendency for any reason whatever for one wheel to turn faster than the other, it will be incapable of having excessive or "runaway" motion.

The mechanism also functions to prevent "balking." "Balking" is the action which occurs when one vehicle wheel insists on doing all of the turning while the other insists on doing none. When this condition obtains the driver of the vehicle is helpless although apparently everything is in proper order.

The present mechanism functions to prevent skidding by preventing the action which may occur under certain circumstances of one wheel momentarily functioning to brake the movement of the car. When a car in rapid motion makes a slight turn such as going around a parked car or for any other reason slightly alters its straight forward movement by reason of the turning of the steering mechanism, and one wheel happens to be on a very slick surface, a slight slip of that wheel causes the wheel to spin for an instant and in that instant the other wheel acts to some extent as a brake, slowing down that corner of the car, because for that instant it is not driven by the machine engine. As a result, the operator finds his car headed in a direction which he does not desire to go, which may have unpleasant results. The present mechanism will avoid the development of a situation of this kind.

What is claimed is:

1. A differential mechanism, comprising a casing, a pair of shafts extending into the casing in axial relation, a pair of gears within the casing and each carried by a shaft, means for rotating the casing, gear pinions rotatably supported by and in the casing and operatively coupled between the gears, a toothed wheel connected with each pinion to rotate coaxially therewith, and a toothed member supported upon the casing and having limited back and forth turning movement on the casing, the teeth of said member being arranged to be alternately engaged by teeth of the said wheels to impart the stated motion to the member for preventing wastage of power through the turning of one shaft and gear faster than the other.

2. A differential mechanism, comprising a casing, a pair of shafts extending into the casing in axial relation, a pair of gears within the casing and each carried by a shaft, means for rotating the casing, gear pinions rotatably supported by and in the casing and operatively coupled between the gears, a toothed wheel connected with each pinion to rotate coaxially therewith, a collar encircling the casing for limited oscillatory movement coaxial with said shafts, said collar having recesses in each of which a wheel is located, a pair of inwardly extending diametrically opposite teeth integral with the collar in each of said recesses, said wheels having an odd number of teeth and the distance between the opposing collar teeth being such with respect to the adjacent wheel that when one of said collar teeth is engaged between a pair of wheel teeth, the opposing collar tooth will be in opposing relation with the point of the wheel tooth.

3. A differential mechanism, comprising a casing, a pair of axles extending into the casing in axial alignment, gears carried by said axles in the casing, trunnions rotatably supported by and in the casing and operatively interposed between said gears, means for rotating the casing, and an escapement mechanism supported by the casing including a shiftable element and a rotary element, the rotary element being operatively connected with a pinion, the shiftable element and rotary element having an escapement relation whereby when the resistance to the rotation of one gear and shaft is considerably less than the resistance to rotation of the other gear and shaft the one with greater resistance will be positively driven at a slower rate than the other, but the ratio of speed will remain constant, thus insuring that the rotation of one gear and shaft during differential action of the mechanism faster than the other gear and shaft to dissipate more than a small fraction of driving power for the shafts, is prevented.

4. A differential mechanism, comprising a casing, a pair of axles extending into the casing in axial alignment, gears carried by said axles in the casing, trunnions rotatably supported by and in the casing and operatively interposed between said gears, means for rotating the casing, and escapement mechanism supported by the casing including a shiftable element and a rotary element, the rotary element being operatively connected with a pinion, the shiftable element and rotary element having an escapement relation, whereby one gear and shaft is positively driven at a slower rate than the other gear and shaft in a constant ratio whenever lack of resistance to rotation of one gear and shaft would normally cause undue action of the differential mechanism, thus preventing dissipation of more than a small fraction of the driving power to the gears and shafts in undue differential action, and means for utilizing the usual lubricating fluid interposed between the shiftable member and the casing to constitute an elastic resistance factor with respect to the escapement motion of the rotary element.

5. In a differential mechanism, including a pair of axially aligned shafts, gears carried by said shaft, rotatably supported pinions interposed between the gears, means for imparting movement to the pinions around the shafts, an escapement mechanism operatively coupled with said pinions and operated on rotation of the same during differential action of the gears, said escapement mechanism being composed of toothed members integral with and rotating with said pinions and a shiftable member as shown, operatively coupled with the toothed members in an alternating camming action in such a manner that during any time when the first of the two shafts meets considerably less resistance to its turning than does the second of the two shafts, differential action is restrained in a manner so as positively to drive the second of the two shafts at a slower rate than the first of the two shafts and maintain a constant ratio of rotation of the two shafts, thus preventing loss of more than a small fraction of driving power for the shafts, and means for utilizing the usual lubricating fluid as an elastic liquid resistance factor for maintaining a smooth, unhurried action of the escapement mechanism.

6. An equalizing differential mechanism designed to be installed between a pair of drive wheels of a motor vehicle comprising a casing, a pair of axle shafts extending into the casing in axial alignment, gears carried by said axles in the casing, pinions rotatably supported by and in the casing and operatively interposed between said gears, means for rotating the casing, a toothed member integral with each pinion, and rotatable axially with the pinion but lying outside the casing, with teeth variable as to number, length and form, a shiftable member encircling the casing and in in near contact with the casing said shiftable member being in operable relation with the rotatable toothed member to develop an alternating camming action, a thin layer of the natural lubricating fluid contained within the housing interposed between the shiftable member and the underlying wall of the casing which the shiftable member encircles, as an elastic factor of resistance to sudden shifts of direction, serving to impart a smoothly gliding motion to the shiftable member, the combination of toothed member, shiftable member and elastic resistance factor constituting a smoothly gliding escapement mechanism serving to retard differential action and cause rotation of the second wheel of a pair slower than the speed of the first wheel of the pair whenever the speed of one of a pair of drive wheels of an automotive vehicle with reference to the speed of the other wheel of the pair exceeds a fixed ratio that may have been determined previously, thus serving to prevent wastage of more than a small fraction of the power delivered to the differential mechanism, thru unneeded differential action.

WILLARD W. LAWRENCE.